United States Patent [19]

Tanuma et al.

[11] Patent Number: 4,945,002
[45] Date of Patent: Jul. 31, 1990

[54] IMPACT-RESISTING ANTI-LACERATIVE WINDOW UNITS

[75] Inventors: Itsuo Tanuma, Sayama; Hideo Takeichi, Tanashi; Masashi Segawa, Kodaira; Toshio Honda, Akigawa, all of Japan

[73] Assignee: Bridgestone Corporation, Tokyo, Japan

[21] Appl. No.: 90,290

[22] Filed: Aug. 28, 1987

[30] Foreign Application Priority Data

Aug. 28, 1986 [JP] Japan .................................. 61-200008
Sep. 29, 1986 [JP] Japan .................................. 61-228277

[51] Int. Cl.$^5$ ...................... B32B 17/10; C03C 27/12
[52] U.S. Cl. ................................. 428/425.6; 428/442; 428/447; 428/437; 428/473.5; 428/476.9; 428/480; 428/522; 428/41; 52/474; 296/84.1
[58] Field of Search .................. 428/473.5, 425.6, 442, 428/447, 476.9, 522, 437, 480

[56] References Cited

U.S. PATENT DOCUMENTS

| | | |
|---|---|---|
| 2,374,056 | 4/1945 | Watkins . |
| 3,622,440 | 11/1971 | Snedeker .................... 156/329 |
| 3,666,614 | 5/1972 | Snedeker et al. ............ 161/182 |
| 4,188,443 | 2/1980 | Mueller et al. . |
| 4,251,591 | 2/1981 | Chi . |
| 4,511,627 | 4/1985 | Tanuma et al. .............. 428/429 |
| 4,600,627 | 7/1986 | Honda et al. ................ 428/441 |

FOREIGN PATENT DOCUMENTS 117770 9/1984 European Pat. Off. .
157030 10/1985 European Pat. Off. .
2442122 11/1978 France .

Primary Examiner—P. C. Ives
Attorney, Agent, or Firm—Sughrue, Mion, Zinn, Macpeak & Seas

[57] ABSTRACT

An impact-resisting anti-lacerative window glass unit of laminate of a sandwich structure is disclosed, which comprises two exterior plate-like member made of a transparent organic polymer (A) and a transparent organic polymer (B) or a transparent inorganic material, respectively, and multilayer structure intermediate films made of at least two kinds of polymers (C). The multilayer structure intermediate films are interposed between two exterior plate-like members. A method of fitting such an impact-resisting anti-lacerative laminate to a window frame or an automobile is also disclosed, which comprises removing a fitting portion of a hard coated transparent organic polymer (A) and the multilayer structure intermediate films through peeling while remaining at least one layer of a high breaking strength material layer as one of at least two kinds of the polymers (C) in the multilayer structure intermediate films on a person's side, and fitting the laminate to the window frame or an automobile body with an adhesive sealant by utilizing a thus exposed surface.

4 Claims, 3 Drawing Sheets

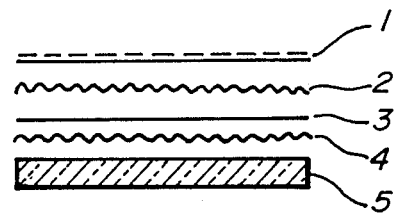
FIG._1
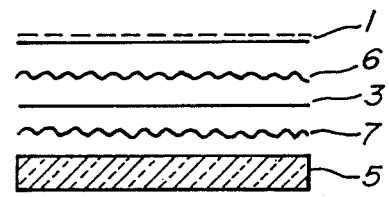
FIG._2
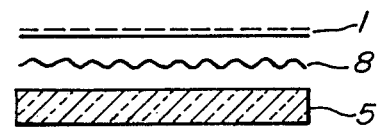
FIG._3
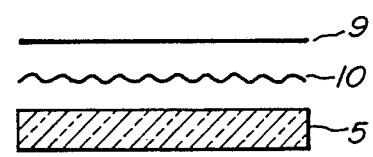
FIG._4
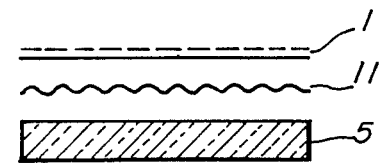
FIG._5

IMPACT-RESISTING ANTI-LACERATIVE WINDOW UNITS

BACKGROUND OF THE INVENTION (1) Field of the Invention:

The present invention relates to anti-lacerative window glass units which have excellent impact resistance and prevent skins, etc. of human heads from being damaged with broken pieces of a glass body of a sandwich structure when an automobile collides with an object. More specifically, the present invention relates to anti-lacerative window glass units which have excellent impact resistance and in which intermediate films of a multilayer structure (hereinafter referred to as "multilayer structure intermediate films") composed of at least two kinds of different polymers are interposed between two exterior plate-like members which are composed of different kinds of organic polymers or the same kind of the organic polymer or between two exterior plate-like members which are composed of an organic polymer and an inorganic material, respectively. When in use, it is necessary to arrange the exterior platelike member of the organic polymer material on a person's side ("Person's side" is used throughout the specification and claims to mean an interior side of a window in a house, an automobile, etc.). The invention also relates to a method of fitting such anti-lacerative window glass laminates to window frames, automobile bodies, etc.

(2) Related Art Statement:

Materials conventionally used as wind shield in automobiles have been improved in the chronological order from a tempered glass, a partially tempered glass, a laminated safety glass to a anti-lacerative laminated glass aiming at enhancing the safety. To the contrary, the number of glasses necessary increases to two from one and an organic resin film is bonded to the glass on a vehicle interior side. Thus, disadvantageous factors occur from the economical standpoint, for instance weight increase and cost-up.

That is, anti-lacerative window glasses which have conventionally been used as safety glass such as windshield glass units each comprise a laminated glass unit using two glass plates as a fundamental structure, and possess an exterior sheet composed of an organic polymer bonded to a person's side of a fundamental structure. Since the laminated glass plates as the fundamental structure themselves essentially have impact resistance, such anti-lacerative window glass units may be called high safety windshield glass. However, a problem remains unsolved that economically disadvantageous factors such as weight increase, cost-up, etc. should surely be solved.

That is, if the number of a glass plate in the glass laminate as the fundamental structure of the conventional anti-lacerative window glass unit is decreased to one to reduce the weight and cost of the windshield glass, economically unmeasurable effects will be obtained.

However, since glass itself is a brittle material, a sufficient penetrating resistance cannot be exhibited only by a countermeasure such as a lining of an urethane base film, polyvinylbutyral/hard coat polyester film or ethylene-vinylacetate copolymer/hard coat polyester film. Thus, it is a present situation that safety glasses which can well withstand practical uses have not been obtained.

SUMMARY OF THE INVENTION

It is a first object of the present invention to improve the drawbacks possessed by the conventional window glasses such as windshield glasses, and to provide impact-resisting anti-lacerative window glass units which are light in weight and have excellent economy.

It is another object of the present invention to provide a method of fitting such impact-resisting anti-lacerative window glass units to window frames, automobile bodies, or the like in order that they may not drop off along the window frames when in collision, while maintaining the same strength as the conventional laminated glasses.

The present inventors had repeatedly made strenuous studies to solve the above-mentioned problems, and discovered that sufficient impact resistance could be obtained even by using a single glass plate when multilayer structure intermediate films composed of at least two kinds of different polymers are used instead of a polyvinyl butyral film or an ethylene-vinyl acetate copolymer conventionally used for lining. As a result, they have accomplished the present invention.

According to the first aspect of the present invention, there is provided an impact-resisting anti-lacerative window glass unit of a sandwich structure, which comprises two exterior plate-like members composed of a transparent organic polymer (A) and another transparent polymer (B) or a transparent inorganic material on the opposite side thereof, and multilayer structure intermediate films composed of at least two kinds of different polymers (C) interposed between the two exterior plate-like members.

According to another aspect of the present invention, there is provided a method of fitting such impact-resisting anti-lacerative window glass units by removing a fitting portion of the impact-resisting anti-lacerative window glass unit at a fitting portion on a person's side such that at least one layer of a higher breaking strength material in the multilayer structure intermediate films composed of polymers having different breaking strengths, and then fitting the window glass unit to a window frame, an automobile body or the like with an adhesive sealant at a thus exposed surface.

These and other objects, features and advantages of the present invention will be well appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1 through 5 are sectional views of impact-resisting anti-lacerative window glass units or laminates of Examples 1 and 2 and Comparative Examples 1 through 3, respectively;

DETAILED DESCRIPTION OF THE INVENTION

Figure 6:
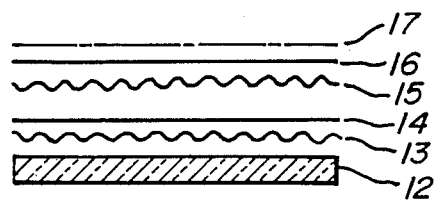
FIG. 6 is a partially sectional view of other anti-lacerative laminate used by way of example according to the second aspect of the present invention.

In the following, the present invention will be explained in more detail. First, the two exterior plate-like members will be explained.

As examples of the exterior plate-like member composed of the transparent polymer (A) used on a person's side according to the present invention, mention may concretely be made of a polyacryl resin film, a polyvinyl chloride resin film, a polyethylene terephthalate resin film, a polyamide resin film, an aromatic polyamide resin film, a polyester polyether resin film, a polysulfone resin film, a polyimide resin film, etc. The resin films surface-treated with a silane base hard coat agent is preferable because of their excellent wear resistance. Among them, the hard coat-applied polyethylene terephthalate resin film is most preferable from the standpoint of transparency, surface smoothness, economy, etc.

The thickness of this exterior plate-like member is preferably not more than 0.15 mm, and more preferably from 0.075 mm to 0.125 mm. That is, if it exceeds 0.15 mm, the penetrating resistance can be enhanced and the thickness of the intermediate films can be made thinner, but, to the contrary, unfavorably, possibility that a human head undergoes a concussion of the brain in collision inevitably increases.

As examples of the exterior plate-like member of a transparent organic polymer on the opposite side, mention may concretely be made of a polyacryl plate, polyvinyl chloride plate, etc. As examples of the exterior plate-like member composed of an inorganic material, mention may concretely be made of a glass plate, a tempered glass plate, a partially tempered glass plate, etc.

Various combinations of the opposite exterior plate-like members are possible by appropriately selecting the exterior plate-like members, but, a combination of [a glass plate/a hard coated polyethylene terephthalate film] may be recited as the most suitable combination of the two exterior plate-like members.

Next, the multilayer structure intermediate films will be explained below.

The intermediate films are fundamentally constituted by alternatively laminating at least two kinds of a transparent resin layer having excellent adhesion and a layer of a high breaking strength material having no adhesion such that the transparent resin layers having excellent adhesion are located on outermost layer sides.

As a material of the transparent resin layer having excellent adhesion, mention may concretely be made of an ethylene-vinyl acetate copolymer (hereinafter referred to as EVA), ethylene-vinyl acetate-triallyl isocyanurate terpolymer (hereinafter referred to as EVAT), a partially saponified product of EVA, polybutylbutyral, polyvinylformal, polyurethane, etc.

Among them, transparent films made of EVA and EVAT are most preferable.

Since the polyvinyl butyral resin has the property (blocking) that is films are adhered to each other during storage or transportation, it is necessary to cool them for preventing the blocking. Further, a temperature at which impact resistance is fully exhibited is set near ordinary temperature (23° C.) and impact resistance extremely lowers at a temperature range other than the above. Thus, this resin is not so preferable.

As a material for the intermediate layer having a high breaking strength as the other element, mention may concreted be made of polyethylene-terephthalate (hereinafter referred to as PET), various polyamides, various aromatic polyamides, various polyester polyethers, various polysulfones, various polyimides, etc. Among them, a film made of PET is preferable from the standpoint of the surface smoothness and economy. With respect to the thicknesses of the intermediate films, the thickness of the transparent resin film having excellent adhesion as one of the elements is preferably from 0.03 mm to 0.5 mm. If it exceeds 0.5 mm, intended weight reduction can not be attained. On the other hand, if it is less than 0.03 mm, resistance is insufficient.

The thickness of the high breaking strength material layer is preferably from 0.03 to 0.125 mm. The reason therefor is that if it exceeds 0.125 mm, there is high possibility that a human head undergoes concussion of the brain in collision, while less than 0.03 mm is unfavorable, because impact resistance is insufficient.

Some automobile windshield glasses are colored at their upper portions to prevent drivers from being blinded with light. For this purpose, the high strength material film in the multilayer structure intermediate films may be preliminarily colored through printing, or alternatively a transparent resin material layer having adhesion may be preliminarily colored as in the conventional laminated glasses.

If necessary, heat ray reflecting film, an electrically conductive film, a colored film, an ornamental film or the like may be formed on any one of the multilayer structure intermediate films to cope with the blinding.

As mentioned in the above, the impact-resisting anti-lacerative window glass units having high impact-resistance and excellent broken glass piece scattering-preventing characteristic over a wide range of temperatures can be obtained.

Preferred embodiments according to the present invention will be explained by way of examples. As shown in the following, it was found out through various studies that an alternatively arranged laminate consisting of an EVA or EVAT film and a PET film, particularly such a laminate of a three layer structure is excellent as the multilayer structure intermediate films and that a combination of a glass plate and a hard coat PET film is preferable as the exterior plate-like members.

|glass plate|EVA|PETfilm |EVA|PET film with hard coat|
          (EVAT)       (EVAT)

multilayer intermediate films

In the above embodiment, sufficient performances can be obtained by three multilayer structure intermediate films. Of course, a good performances can also be obtained by four or more intermediate films, but they are disadvantageous from the economical standpoint of view.

The present invention will be explained in more detail with reference to the following examples. They are merely given in illustration of the invention, but should never be interpreted to limit the scope of the invention.

First, matters concerning Examples and Comparative Examples will be described below.

(1) Preparation of sheets of adhesive transparent resin materials:

Compositions shown in Table 1 were each mixed by a roll mill heated at about 80° C., and two kinds of transparent resin compositions were prepared.

Next, sheets of an adhesive transparent resin material were prepared in a given thickness by using each of the above compositions as a starting material by means of a press heated at about 100° C.

TABLE 1

| Compositions for adherent intermediate layers | | |
|---|---|---|
| Recipe | Symbol | |
| (parts by weight) | A | B |
| EVA | 100.0 | 100.0 |
| (manufactured by Toyo Soda Kogyo Kabushiki Kaisha, Trade name: Ultrasen 634) | | |
| Dicumyl peroxide | 1.0 | 1.0 |
| γ-Methacryloxypropyl trimethoxysilane | 0.3 | 0.3 |
| Triallylisocyanurate | — | 5.0 |

(2) High strength material for intermediate film layers:

Among PET films, O-type polyester (hereinafter referred to as O-PET) manufactured by Teijin Kabushiki Kaisha was mainly used as the high breaking strength material of the intermediate film layers.

(3) An exterior sheet on a person's side:

As the exterior sheet on the person's side, a PET film (manufactured by Toray Kabushiki Kaisha, trade name: Toughtop) (hereinafter referred to as hard coat PET film) which was hard coated on one side at a thickness of several microns in the state that the hard coated surface was directed outside.

(4) Preparation of safety glass laminates:

A multilayer structure intermediate films were prepared by using the EVA sheet and the PET film at the desired thicknesses, and interposed between a float glass plate preliminarily washed and dried and the hard coated PET film. Then, a cover glass plate (2 mm thick) was placed on the float glass plate, which were preliminarily pressure bonded at about 90° C. for 15 minutes under vacuum in a preliminarily pressure bonding vacuum bag. Then, the preliminarily pressure bonded laminate was completely pressure bonded at 143° C. for 50 minutes under 15 atoms in an autoclave vessel.

After the sample was taken out from the autoclave, the cover glass plate was removed, thereby obtaining a safety glass laminate.

(5) Performance-evaluating methods (Ball-dropping test):

(a) With respect to the glass laminates in Examples and Comparative Examples, ball-dropping tests were carried out according to JIS R-3212 by using a steel ball of 2.26 kg. With respect to each kind of the glass laminates, six samples were tested.

(b) The test was carried out by leaving each sample in a thermostat vessel at 25° C. for 4 hours or more.

(c) Tests were conducted by dropping the steel ball onto an inside exterior sheet from a specific height.

In FIGS. 1 through 5, reference numerals 1 through 11 denote the following (Compositions A and B in parentheses correspond to A and B in Table 1, respectively).

1. 0.1 mm thick hard coat PET film (Toray, Toughtop)
2. 0.1 mm thick EVA sheet (Composition A)
3. 0.1 mm thick O-PET film (manufactured by Teijin Kabushiki Kaisha)
4. 0.2 mm thick EVA sheet (Composition A)
5. 3 mm thick float glass
6. 0.1 mm thick EVAT sheet (Composition B)
7. 0.2 mm thick EVAT sheet (Composition B)
8. 0.4 mm thick EVAT sheet (Composition B)
9. 0.2 mm thick O-PET film
10. 0.3 mm thick EVAT sheet (Composition B)
11. 0.4 mm thick polyvinyl butyral film

EXAMPLE 1

A glass laminate having a structure shown in FIG. 1 was prepared. The resulting glass laminate had excellent transparency and was free from optical strain. None of six samples allowed penetration of the steel ball in the ball-dropping test (height, 4 mm).

Further, although tests were carried out again while the height from which the steel ball was dropped was raised to 6 m, the steel ball did not penetrate the samples.

EXAMPLE 2

A glass laminate having a structure shown in FIG. 2 was prepared. This glass laminate had excellent transparency and was free from optical strain.

The samples were subjected to the ball-dropping test, but none of them allowed penetration of the steel ball therethrough when the ball was dropped from both heights of 4 m and 6 m.

COMPARATIVE EXAMPLE 1

A glass laminate shown in FIG. 3 was prepared by using a single EVAT sheet layer as the intermediate layer.

The thus obtained samples were subjected to the ball-dropping test from a height of 4 m, and all allowed the penetration of the ball.

COMPARATIVE EXAMPLE 2

A glass laminate shown in FIG. 4 (material for the inner side exterior sheet: O-PET film) was prepared.

In the ball falling tests in which a steel ball was dropped from a height of 4 m or 6 m, the steel ball did not penetrate the samples.

While a height (a bound height) at which the steel ball bounded back when being dropped was within about 30 cm in the case of Examples 1 and 2, that in the case of Comparative Examples 2 exhibited as large a value as about 1.0 m to 1.5 m.

From the above comparison, Comparative Example 2 had insufficient impact absorbing property when a human body actually collides with the laminate. Thus, it has a problem in safety as one of key points, and is considered to be rejected.

COMPARATIVE EXAMPLE 3

A glass laminate as shown in FIG. 5 was prepared by using an intermediate film of a polyvinyl butyral (manufactured by Du'Pont; trade name Butasite).

The samples were subjected to the ball-dropping test from a height of 4 m, which revealed that the steel ball penetrated through all the samples.

In addition, it was found that the samples underwent perpetual deformation with sight-through strain in a hot blast blowing test at 80° C. by means of a drier or a pencile-pushing test from the side of a hard coat surface of the PET film and their heat resistance and compression resistance were poorer. No such deformation was recognized in the samples of Examples 1 and 2.

According to the present invention, the following effects can be attained.

(1) As compared with the conventional anti-lacerative window glass units constituted such that a glass laminate using two glass plates is employed as a fundamental structure and a layer made of an organic polymer material is bonded to an inner side (person's side), the impact-resisting anti-lacerative windows glass units according to the present invention are extremely economically advantageous in that the weight is largely reduced and cost is largely lowered.

(2) Since the impact-resisting anti-lacerative window glass units according to the present invention have excellent impact resistance and an amount of broken glass pieces scattering at the time of breakage in collision is extremely small, they have extremely high safety.

(3) In addition, since the impact-resisting anti-lacerative window glass units according to the present invention have excellent heat resistance and compression resistance, an applicable range is expected to widen.

Now, the second aspect of the present invention will be explained below.

The second aspect of the present invention relates to a method of fitting the anti-lacerative laminates to window frames or automobile bodies. As mentioned above, the anti-lacerative laminates are constituted by interposing the multilayer structure intermediate films composed of at least two kinds of polymers having different breaking strengths between the exterior plate-like members made of the transparent polymer and the transparent inorganic material. The second aspect of the present invention is directed to a method of fitting the anti-lacerative window glass units of the first aspect of the invention to the window frames, etc. That is, as compared with the conventional glass laminates using two glass plates, according to the anti-lacerative window glass unit in the first aspect of the invention, the weight is extremely reduced because a single glass plate is used. When it is used as a front glass, economical effect is extremely large due to saved fuel consumption, etc.

However, inconvenience occurs when such a anti-lacerative window glass unit is to be attached to a window frame, an automobile body or the like, because a single glass plate is used.

That is, in the recent conventional anti-lacerative safety glass units, a transparent film having excellent adhesion is laminated upon the person's side of the glass unit using two glass plates. Therefore, when the anti-lacerative window glass unit is fitted to the window frame or the automobile body, the adhesive film made of the transparent organic polymer is peeled off at a fitting portion to expose the glass surface and is fitted to the window frame or the automobile body by utilizing the thus exposed glass surface. For this reason, even if the glass laminate is broken along the inside of the adhered portion in collision, the whole window glass will not remove and drop off due to the intermediate film interposed and bonding between the laminate glass plates.

On the other hand, according to the anti-lacerative window glass units developed by the present inventors using a single glass plate, the hard coat layer of the exterior plate-like member on the person's side has excellent wear resistance, smoothness transparency, etc. among the performances, while on the other hand, there is possibility that the window glass unit cannot be fitted to the window frame or the automobile body by a bonding technique because the hard coat layer has no adhesion. If the layer or layers on the person's side are peeled off at the fitting portion and the window glass unit is fitted to the window frame or the automobile body at the glass surface according to the conventional method, the glass plate may be broken along the inside of the window frame at the time of collision since only a single glass plate is located at the fitting portion. Consequently, the whole window may be removed therefrom. Thus, this fitting technique cannot be applied to the anti-lacerative window glass units of this type.

As mentioned in the above, to improve the above fitting method is an important task to practically use the anti-lacerative laminates.

The second aspect of the present invention relates to a novel method of fitting the anti-lacerative laminates comprising two exterior plate-like members of an outermost layer of a hard coated transparent organic polymer on the person's side and a transparent inorganic material on the open air side, and a multilayer structure intermediate films made of at least two kinds of polymers having different breaking strengths inserted therebetween, and is characterized in that when the anti-lacerative laminate is to be fitted to a window frame or an automobile body, the fitting portion of the laminate is peeled off on the person's side while leaving at least one layer of the high breaking strength material and the anti-lacerative laminate is fitted to the window frame or the automobile body with an adhesive sealant by utilizing the thus exposed surface.

As examples of the inorganic transparent materials used for the exterior plate-like member on the open air side, mention may be made of glass, tempered glass and partially tempered glass.

With respect to the exterior plate-like member made of the transparent organic polymer used on the person's side, the same materials recited in the explanation of the first aspect of the present invention may be used. The transparent organic polymers surfacetreated with a silane base hard coat agent are preferable because of their excellent wear resistance. Among them, the hard coated polyethylene terephthalate resin film is most preferable from the standpoint of the transparency, surface smoothness, economy, etc.

The same as mentioned in the above are said with respect to the thickness of the above exterior platelike member.

Next, the multilayer structure intermediate films made of at least two kinds of polymers having different breaking strengths interposed between the two exterior plate-like members will be explained. As examples of the polymer as the intermediate film used for enhancing adhesion between the two exterior plate-like members, a transparent ethylene-vinyl acetate copolymer, an ethylene-vinyl acetate-triallylisocyanurate terpolymer, a partially saponified product of an ethylene-vinyl acetate copolymer, polyvinyl butyral, polyvinyl formal, polyurethane, etc.

As mentioned in the foregoing, since the polyvinyl butyral has a blocking property (polyvinyl butyl films adhere to each other during storage and transportation), it is necessary to prevent the adhesion through cooling. In addition, a temperature at which the impact resistance is exhibited to the maximum is set near ordinary temperature (23° C.) and the impact resistance is lowered at a temperature range other than the above. Thus, the polyvinyl-butyral resin is not so preferable. To the contrary, transparent films of the ethylene-vinyl acetate copolymer and the ethylene-vinyl acetatetriallyisocyanurate terpolymer are most preferable because of being free from such disadvantages.

As examples of the polymer having higher breaking strength, polyethylene terephthalate, various polyamides, various aromatic polyamides, various polyester polyethers, various polysulfones, various polyimides, etc. may be recited.

Among them, the polyethylene terephthalate is more preferable from the standpoint of the surface smoothness, strength, and economy.

FIG. 6 shows a preferred embodiment of the anti-lacerative laminate used in the present invention. In FIGS. 6-11, reference numerals denote the follow materials and values in parentheses do their preferable thicknesses.

12: a float glass as a transparent inorganic material (an exterior plate-like member on the open air side) (1.0 to 5.0 mm)

13,15: EVAT film as an intermediate film material having excellent adhesion (0.03 to 0.5 mm)

14: PET film as a high breaking strength material (0.01 to 0.3 mm)

16: PET film (an exterior plate-like member on a person's side) (0.05 to 0.3 mm including the hard coat layer 17).

17: hard coat layer

The fitting method according to the present invention will be explained with reference to FIGS. 7 to 11.

As mentioned in the above, when the anti-lacerative laminate is to be fitted to the window frame or the automobile body, the multilayer structure intermediate films are removed at the fitting portion on the person's side provided that at least one layer of the high breaking strength material among the intermediate films is remained and the laminate is then fitted to the window frame or the automobile body with an adhesive sealant by utilizing the thus exposed surface. With reference to the anti-lacerative laminate shown in FIG. 6 by way of example, at least the film 2 having excellent adhesion and the film 3 made of the high breaking strength material are left as a fitting portion, and the intended object of the present invention is attained by bonding the fitting portion to the automobile body.

Figure 8:
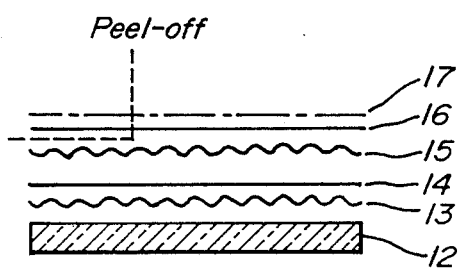
Figure 9:
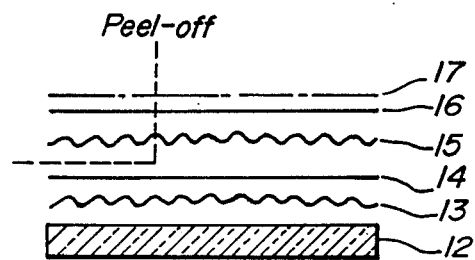
Figure 10:
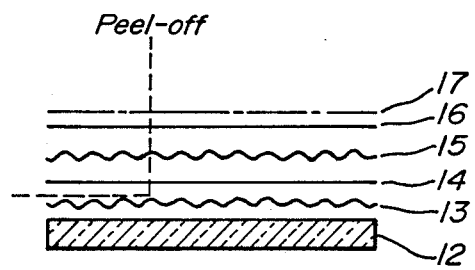
FIGS. 10 and 11 are partially sectional views (on one side only) illustrating fitting methods as comparison.
Figure 11:
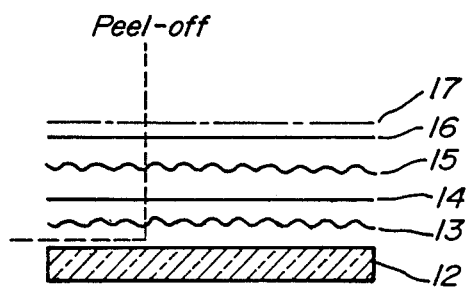

As examples of film-removing ways, while up to the PET film layer 3 as the high breaking strength material is retained, the other layers on the person's side are removed (FIG. 9). Or, up to the layer 4 is retained (FIG. 8). Alternatively, up to the layer 5 is retained (FIG. 7).

Figure 7:
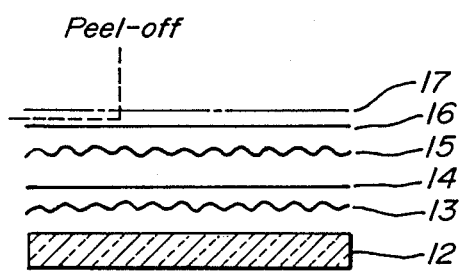
FIGS. 7 through 9 are partially sectional views of the anti-lacerative laminate (on one side only) illustrating the fitting method according to the present invention.

As concrete peeling methods, in FIG. 7, the hard coat layer only is removed at the fitting portion by means of a sand paper or a steel wool. In FIGS. 8 and 9, a knife is inserted into a peeling location to remove necessary layers through peeling.

The method of removing only the surface hard coat layer with the sand paper or the steel wool as in FIG. 7 has no problem in terms of the performances, but it is troublesome in working and a peeled portion is surely prevented from extending beyond a window frame portion from the standpoint of appearance. Thus, such a method is not so preferable in practice due to accompanying difficulties.

To the contrary, the method of peeling as illustrated in the FIGS. 8 and 9 are extremely convenient and preferable. As a matter of course, when a masking tape (for instance, a cellophane tape) is inserted and bonded between the layers to be separated and the layer or layers to be peeled are peeled together with the masking tape, working efficiency is improved and products having good appearance can be obtained. Thus, such methods are effective.

As the method of fitting the fitting portion-peeled laminate to a window frame or an automobile body, any one of a bonding technique or a mechanically fitting technique may be employed. In the bonding technique, a one liquid type or two liquid hardening type sealant such as an epoxy base sealant, an urethane base sealant or a silicon base sealant, which is ordinarily employed for fitting front glasses to automobile bodies, is used alone or together with an adhesive primer or a bonding primer. The mechanically fitting method is a technique used in ordinary constructing or building.

In the following, the second aspect of the present invention will be explained in more detail with reference to specific Examples.

(1) Performance evaluations:

With respect to the performance evaluations, the same methods as stated in connection with the first aspect of the present invention were employed.

(2) Test samples

Test samples were prepared by peeling fitting portions of laminates consisting of the following layers of FIG. 6 as shown in FIGS. 7 to 11. In FIG. 6 through 11.

12: 3 mm thick float glass 13 and 15: 0.1 mm thick EVAT film

14: 0.1 mm thick O-PET film (O-type polyester film) manufactured by Teijin Kabushiki Kaisha 16 and 17: 0.1 mm thick hard coat PET

EXAMPLES 3 TO 5 AND COMPARATIVE EXAMPLES 4 and 5

Test samples were prepared by peeling off a fitting portion over a width of 15 mm at four sides of each of anti-lacerative laminates having a size of 305 mm×305 mm as constructed in FIG. 6. Each of the samples had a sight opening of 275 mm×275 mm, and was bonded to a ball drop testing table at the peeled-off portion of 15 mm wide at the four sides by using urethane base adhesive. A steel ball was dropped onto the center of the laminate from a height of 6 m, and results were observed.

The results were shown in Table 2.

TABLE 2

| | Results in performance evaluations | | |
|---|---|---|---|
| No. | Peeled location | FIG. 3 No. | Results |
| Comparative Example 4 | Between layers 12 and 13 glass surface exposed | 6 | Six test samples all dropped leaving four sides of 15 mm width. |
| Comparative Example 5 | Between layers 13 and 14 | 5 | Six test samples all dropped leaving four sides of 15 mm width. |
| Example 3 | Between layers 14 and 15 | 4 | Six test samples all remained at window frames, and had good penetrating resistance. |
| Example 4 | Between layers 15 and 16 | 3 | Six test samples all remained at window frames, and has good penetrating resistance. |
| Example 5 | Between layers 16 and 17 | 2 | Six test samples all remained at window frames, and |

TABLE 2-continued

| | Results in performance evaluations | | |
|---|---|---|---|
| No. | Peeled location | FIG. 3 No. | Results |
| | | | had good pentetrating resistance. |

As seen from the results in Table 2, in the case of Examples 3 to 5 in which the PET layer 14 was retained in the fitting portion, the laminate did not disassembled or drop form the fitting table in collision with the steel ball, and penetrating resistance is sufficient. Thus, they sufficiently meet the required performances.

To the contrary, in the case of Comparative Examples 4 and 5 in which no PET layer 14 was retained, the laminate was broken and dropped off in the collision with the steel ball while the fitting portion only remained at the fitting table. Thus, Comparative Examples 4 and 5 are inappropriate methods.

The following effects were obtained by the completion of the second aspect of the present invention.

(1) As compared with the conventional anti-lacerative laminate using the laminate glass as a base, it becomes possible to fit the single glass type anti-lacerative laminate of lighter weight and higher safety to automobile bodies or window frames.

(2) As a result, the latter anti-lacerative laminates can be practically used, and great effects such as improved safety and reduced fuel consumption of automobiles can be attained.

What is claimed is:

1. An impact-resisting anti-lacerative window unit of a sandwich structure comprising two exterior plate-like members made of a transparent organic polymer (A) and a transparent organic polymer (B) or a glass plate, respectively, and multilayer structure intermediate films interposed between the exterior platelike members, wherein said films consist essentially of alternatively laminated ethylene-vinyl acetate and ethylene-vinyl acetate triallyl isocyanurate terpolymer layers having therebetween a layer of a high breaking strength material selected from the group consisting of polyethylene terephthalate, polyamides, aromatic polyamides, polyester polyethers, polysulfones and polyimides.

2. An impact-resisting anti-lacerative window unit according to claim 1, wherein said intermediate layer having high breaking strength is polyethylene terephthalate.

3. An impact-resisting anti-lacerative window unit according to claim 1, wherein the exterior plate-like member made of the transparent organic polymer material (A) is a transparent film of polyethylene terephthalate.

4. An impact-resisting anti-lacerative window unit according to claim 1, wherein a surface of the exterior plate-like member of the transparent organic polymer (A) is treated with a silane base hard coat agent.

* * * * *